US011915647B2

(12) United States Patent
Nishiyama

(10) Patent No.: US 11,915,647 B2
(45) Date of Patent: Feb. 27, 2024

(54) DISPLAY DEVICE EQUIPPED WITH CURRENT-DRIVEN ELECTRO-OPTICAL ELEMENTS

(71) Applicant: Sharp Kabushiki Kaisha, Osaka (JP)

(72) Inventor: Takayuki Nishiyama, Sakai (JP)

(73) Assignee: SHAR KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/765,599

(22) PCT Filed: Oct. 2, 2019

(86) PCT No.: PCT/JP2019/038920
§ 371 (c)(1),
(2) Date: Mar. 31, 2022

(87) PCT Pub. No.: WO2021/064894
PCT Pub. Date: Apr. 8, 2021

(65) Prior Publication Data

US 2022/0343847 A1 Oct. 27, 2022

(51) Int. Cl.
*G09G 3/32* (2016.01)
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0842* (2013.01); *G09G 2310/027* (2013.01)

(58) Field of Classification Search
CPC ... G09G 3/30–3291; G09G 2300/0842; G09G 2310/027
See application file for complete search history.

(56) References Cited

U.S. PATENT DOCUMENTS

2007/0139314 A1* 6/2007 Park .................... G09G 3/3233 345/76
2018/0102086 A1* 4/2018 Katayama ........... H01L 29/7869
2018/0357966 A1* 12/2018 Ma ....................... G09G 3/3266
2019/0213958 A1* 7/2019 Cho ...................... G09G 3/3266
2020/0320930 A1* 10/2020 Toyotaka ................. G09F 9/30

FOREIGN PATENT DOCUMENTS

JP 2014-044316 A 3/2014

* cited by examiner

*Primary Examiner* — Roy P Rabindranath
(74) *Attorney, Agent, or Firm* — Keating & Bennett, LLP

(57) ABSTRACT

A pixel circuit includes an organic EL element configured to emit light, a capacitor configured to hold a data voltage, a drive transistor with a data gate connected to one electrode of the capacitor, and a diode connection transistor connected between a source of the drive transistor and the organic EL element. A source of the diode connection transistor is connected to a back gate of the drive transistor. In a case where a channel length of the drive transistor is taken as $L_1$, a channel length of the diode connection transistor is taken as $L_2$, a ratio of a channel width to a channel length of the drive transistor is taken as $(W/L)_1$, and a ratio of a channel width to a channel length of the diode connection transistor is taken as $(W/L)_2$, a relation of $L_1<L_2$ and a relation of $(W/L)_1<(W/L)_2$ are satisfied.

16 Claims, 7 Drawing Sheets

DISPLAY DEVICE EQUIPPED WITH CURRENT-DRIVEN ELECTRO-OPTICAL ELEMENTS

TECHNICAL FIELD

The disclosure relates to a display device equipped with current-driven electro-optical elements, and particularly relates to an active matrix display device.

BACKGROUND ART

Current-driven organic EL elements are well known as electro-optical elements included in pixels arranged in a matrix. In recent years, display devices including organic Electro Luminescence (EL) in pixels have been actively developed because a display incorporating the display device can be widened and thinned, and vividness for a display image attracts attention.

In particular, an active matrix display device is provided in many cases in which current-driven electro-optical elements and switch elements such as thin film transistors (TFTs) configured to individually control the electro-optical elements are provided in respective pixels, and each individual electro-optical element is controlled for each pixel. This is because, when the display device is an active matrix display device, an image can be displayed with higher-resolution than a passive display device.

Here, a connection line formed along a horizontal direction for each row, and a data line and a power supply line formed along a vertical direction for each column are provided in an active matrix display device. Each of the pixels includes an electro-optical element, a connection transistor, a drive transistor, and a capacity. The connection transistor is turned on when a voltage is applied to the connection line, and data can be written when the capacity is charged with a data voltage (data signal) on the data line. The drive transistor is turned on by the data voltage with which the capacity is charged, and a current from the power supply line is caused to flow through the electro-optical element so that the pixel can emit light.

Accordingly, in the active matrix organic EL display device using the organic EL elements, the value of a current flowing through the organic EL element of each pixel is controlled by the voltage applied to the drive transistor to emit light at a desired luminance, thereby achieving a gray scale expression of each pixel. Furthermore, in a case that the organic EL display device is caused to perform display at low luminance, the current flowing through each organic EL element needs to be reduced, so that a subthreshold region in which a gate-source voltage of the drive transistor is equal to or less than a threshold value has been used.

CITATION LIST

Patent Literature

PTL 1: JP 2014-44316 A

SUMMARY

Technical Problem

However, subthreshold characteristics of the drive transistor are regions where a current value changes abruptly with changes in a gate voltage, and a gate voltage difference to express a difference of one gray scale may be lower than an incremental value of the data driver supplying the data voltage in some cases, and thus, it has been difficult to achieve a good gray scale expression. In addition, there has been a problem in that the gray scale expression for each pixel is affected by the characteristic variation of the drive transistor, and gray scale unevenness is generated.

Therefore, an object of the disclosure is to provide a display device that can reduce the effect of characteristic variation of a drive transistor and can achieve a favorable gray scale expression even at low luminance.

Solution to Problem

To solve the above problems, a display device according to a first aspect of the disclosure includes a display element configured to emit light by a current flowing through the display element, a capacitor configured to hold a data voltage, a drive transistor with a data gate connected to one electrode of the capacitor, and a diode connection transistor connected between a source of the drive transistor and the display element. A source of the diode connection transistor is connected to a back gate of the drive transistor. In a case that a channel length of the drive transistor is taken as $L_1$, a channel length of the diode connection transistor is taken as $L_2$, a ratio of a channel width W to a channel length L of the drive transistor is taken as $(W/L)_1$, and a ratio of a channel width W to a channel length L of the diode connection transistor is taken as $(W/L)_2$, a relation of $L_1<L_2$, and a relation of $(W/L)_1<(W/L)_2$ are satisfied.

According to the above configuration, a source potential of the diode connection transistor that is input to the back gate of the drive transistor adjusts a relationship between a gate voltage and a current value in subthreshold characteristics of the drive transistor, so that a change in the current value due to a change in the gate voltage is made to be gentle. This can reduce the effect of characteristic variation of the drive transistor and achieve a favorable gray scale expression even at low luminance.

Further, by the relation of $(W/L)_1<(W/L)_2$ being satisfied, a threshold value of the drive transistor is lower than a threshold value of the diode connection transistor, and the diode connection transistor is effective as a source load with respect to the drive transistor when the current is low, while the diode connection transistor is disabled as a source load with respect to the drive transistor when the current is high. As a result, many voltage widths can be prevented from being allocated to a high gray scale region, and an increase in power consumption of the organic EL display device can be suppressed.

To solve the above problems, a display device according to a second aspect of the disclosure includes a display element configured to emit light by a current flowing through the display element, a capacitor configured to hold a data voltage, a drive transistor with a data gate connected to one electrode of the capacitor, and a diode connection transistor connected between a source of the drive transistor and the display element. A source of the diode connection transistor is connected to a back gate of the drive transistor. In a case that a channel capacity of the drive transistor is taken as $(Cox)_1$, a channel capacity of the diode connection transistor is taken as $(Cox)_2$, (channel capacity·channel width/channel length) of the drive transistor is taken as $(Cox\cdot W/L)_1$, and (channel capacity·channel width/channel length) of the diode connection transistor is taken as $(Cox\cdot W/L)_2$, a relation of $(Cox)_1>(Cox)_2$, and a relation of $(Cox\cdot W/L)_1<(Cox\cdot W/L)_2$ are satisfied.

According to the above configuration, a source potential of the diode connection transistor that is input to the back gate of the drive transistor adjusts a relationship between a gate voltage and a current value in subthreshold characteristics of the drive transistor, so that a change in the current value due to a change in the gate voltage is made to be gentle. This can reduce the effect of characteristic variation of the drive transistor and achieve a favorable gray scale expression even at low luminance.

Further, by the relation of $(Cox\cdot W/L)_1<(Cox\cdot W/L)_2$ being satisfied, a threshold value of the drive transistor is lower than a threshold value of the diode connection transistor, and the diode connection transistor is effective as a source load with respect to the drive transistor when the current is low, while the diode connection transistor is disabled as a source load with respect to the drive transistor when the current is high. As a result, many voltage widths can be suppressed from being allocated to a high gray scale region, and an increase in power consumption of the organic EL display device can be suppressed.

To solve the above problems, a display device according to a third aspect of the disclosure includes a display element configured to emit light by a current flowing through the display element, a capacitor configured to hold a data voltage, a drive transistor with a data gate connected to one electrode of the capacitor, and a diode connection transistor connected between a source of the drive transistor and the display element. A source of the diode connection transistor is connected to a back gate of the drive transistor. A channel of the drive transistor is made of an oxide semiconductor, and a channel of the diode connection transistor is made of polysilicon.

In the display device described above, in a case that a threshold value of the drive transistor is taken as $Vth_1$ and a threshold value of the diode connection transistor is taken as $Vth_2$, a configuration satisfying a relation of $Vth_1<Vth_2$ can be achieved.

The display device described above can achieve a configuration in which a back gate of the diode connection transistor is connected to the source of the diode connection transistor.

The display device described above can achieve a configuration in which the back gate of the drive transistor and the back gate of the diode connection transistor are formed to be common to each other, and the common back gate is connected to the source of the diode connection transistor.

The display device described above can achieve a configuration in which a plurality of the diode connection transistors are provided, and a source of the diode connection transistor closest to the display element is connected to the back gate of the drive transistor.

The display device described above can achieve a configuration in which a constant-voltage power supply is connected to the back gate of the diode connection transistor.

The display device described above can achieve a configuration in which the constant-voltage power supply is a low-level power supply.

The display device described above can achieve a configuration in which a first gate insulating film of the data gate of the drive transistor and a second gate insulating film of a data gate of the diode connection transistor satisfy a relation of (a film thickness of the first gate insulating film)<(a film thickness of the second gate insulating film).

The display device described above can achieve a configuration in which the first gate insulating film of the data gate of the drive transistor and the second gate insulating film of the data gate of the diode connection transistor satisfy a relation of (a dielectric constant of the first gate insulating film)>(a dielectric constant of the second gate insulating film).

Advantageous Effects of Disclosure

The display device of the disclosure makes it possible to reduce the effect of characteristic variation of the drive transistor, and achieve a favorable gray scale expression even at low luminance. Furthermore, many voltage widths can be prevented from being allocated to a high gray scale region, and an increase in power consumption of the organic EL display device can be suppressed.

DESCRIPTION OF EMBODIMENTS

First Embodiment

Figure 1:
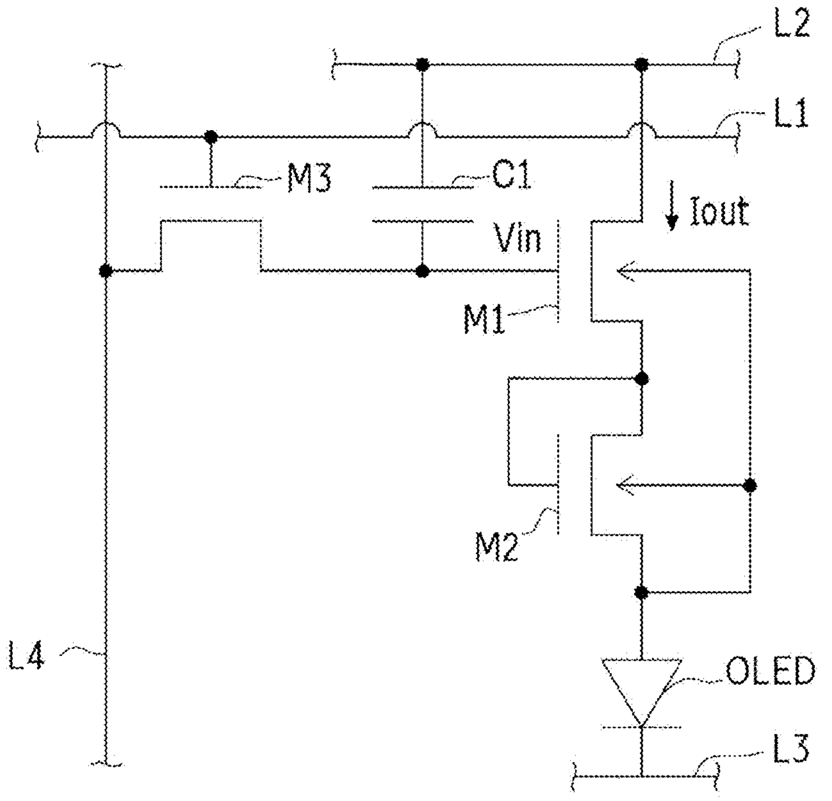
FIG. 1 is a circuit diagram illustrating one pixel of an organic EL display device (Example 1) according to a first embodiment.

A first embodiment according to the disclosure will be described below in detail with reference to the drawings. In the present specification and the drawings, constituent elements having substantially the same functional configurations will be given the same reference signs, and redundant descriptions thereof will be omitted. FIG. 1 is a circuit diagram illustrating one pixel of an organic EL display device of the first embodiment.

As illustrated in FIG. 1, in an active matrix organic EL display device, there are provided a scan control line L1 formed along a horizontal direction for each row, a high-level power supply line L2 and a low-level power supply line L3, and a data line L4 formed along a vertical direction for each column. Further, each of pixels of the organic EL display device includes a drive transistor M1, a diode connection transistor M2, a writing transistor M3, a capacitor C1, and an organic EL element (display element) OLED.

In each pixel of the organic EL display device, the writing transistor M3 is turned on by applying a voltage to the scan control line L1, and then the capacitor C1 is charged with a data voltage (a data signal) Vin on the data line L4, thereby making it possible for data to be written. Then, the drive transistor M1 is turned on by the data voltage Vin, with which the capacitor C1 is charged, and a current Iout is allowed to flow from the high-level power supply line L2 to the low-level power supply line L3, thereby making it possible for the organic EL element OLED to emit light. At this time, the current Iout flows through the organic EL element OLED via the drive transistor M1 and the diode connection transistor M2.

The drive transistor M1 is connected to the data line L4 via the writing transistor M3, and a gate (data gate) thereof as a control terminal is connected to the capacitor C1 for holding the data voltage Vin. The drive transistor M1 may control the value of a current that flows by a voltage being applied to the gate as described above, and may be, for example, formed of a field-effect transistor (FET) constituted of polysilicon, amorphous silicon, and an oxide semiconductor. The diode connection transistor M2 is connected to the source of the drive transistor M1, the high-level power supply line L2 is connected to the drain thereof, and the source of the diode connection transistor M2 is connected to the back gate thereof. Note that in the transistor, the data gate refers to a gate electrode to which the data voltage is input, and the back gate refers to a gate electrode formed on the opposite side to the data gate. For example, in the case of a structure in which gate electrodes are formed on the upper and lower sides of a semiconductor layer with gate insulating films interposed therebetween, the bottom gate electrode becomes the back gate when the top gate electrode becomes the data gate, and the top gate electrode becomes the back gate when the bottom gate electrode becomes the data gate. Hereinafter, the data gate is also simply referred to as the gate.

When the data voltage Vin is applied to the gate of the drive transistor M1 and a source potential of the diode connection transistor M2 is input to the back gate thereof, the current Iout flows therethrough. The source potential of the diode connection transistor M2 input to the back gate is substantially constant over a period when the drive transistor M1 acts in an on state, that is, substantially constant at least in a light emission period. The drive transistor M1 may be a transistor with an n-type channel or may be a transistor with a p-type channel; in the present embodiment, the drive transistor M1 and the diode connection transistor M2 will be each described as an n-type channel transistor.

The diode connection transistor M2 is a transistor connected in series to the source of the drive transistor M1, and may use an FET similar to the drive transistor M1, for example. However, in the present embodiment, the design of the drive transistor M1 and the design of the diode connection transistor M2 differ from each other. The reason for this will be described below.

The drain of the diode connection transistor M2 is connected to the source of the drive transistor M1, and the source of the diode connection transistor M2 is connected to the organic EL element OLED. The gate and the drain of the diode connection transistor M2 are short-circuited to have a configuration generally known as a diode connection of a transistor.

In FIG. 1, the back gate and the source of the diode connection transistor M2 are short-circuited, and this short circuit prevents the wraparound of the electric field and may improve the saturation property of a MOSFET. However, the back gate of the diode connection transistor M2 is not necessary to be short-circuited with the source thereof, and may be connected to another constant-voltage power supply. Alternatively, the diode connection transistor M2 may not have a back gate.

When a constant voltage is input to the back gate of the diode connection transistor M2, it is sufficient that the constant voltage is lower than the voltage of the source of the diode connection transistor M2. For example, in a case where the constant voltage is ELVSS (a potential of the low-level power supply line L3), a negative potential difference corresponding to an amount of voltage drop of the organic EL element OLED is applied to the back gate of the diode connection transistor M2. As a result, the threshold value of the diode connection transistor M2 moves to a positive side, and as described below, the threshold value of the diode connection transistor M2 may be changed to a threshold value greater than the threshold value of the drive transistor M1.

The organic EL element OLED is an electro-optical element that emits light by the current flowing, and is an element constituting one pixel of the organic EL display device. The organic EL element OLED has an anode connected to the source of the diode connection transistor M2 and a cathode connected to the low-level power supply line L3. Here, only one among RGB colors constituting one pixel of the organic EL display device is exemplified. A switching transistor such as a light emission control transistor (not illustrated) configured to control light emission may be provided between the diode connection transistor M2 and the organic EL element OLED. In the disclosure, the connection of the back gate of the drive transistor M1 to the source of the diode connection transistor M2 also includes a connection of the back gate of the drive transistor M1 to a node (a conduction terminal) between the switching transistor and the organic EL element OLED. The resistance of the switching transistor is sufficiently low to be ignored as compared to the drive transistor M1 and the diode connection transistor M2. Therefore, even when the switching transistor is connected to the node described above, the effect of the disclosure is exhibited.

In the organic EL display device of the present embodiment illustrated in FIG. 1, a relationship between the gate voltage and the current value in the subthreshold characteristics of the drive transistor M1 is adjusted by the source potential of the diode connection transistor M2 input to the back gate of the drive transistor M1, so that the change in the current value due to the change in the gate voltage is made to be gentle (hereinafter, also referred to as "the S value is great"). Accordingly, the subthreshold region of the drive transistor M1 is widened, and a difference in the data voltage Vin required to change the current Iout corresponding to one gray scale is increased, so that gray scale control may be performed favorably within a control range of the voltage value output from a data driver. With this, the effect of characteristic variation of the drive transistor may be reduced and a favorable gray scale expression may be achieved even at low luminance, and it is also easy to perform the gray scale control at high luminance.

As described above, in the organic EL display device according to the present embodiment, the design of the drive transistor M1 and the design of the diode connection transistor M2 differ from each other. The reason for this will be described below.

Figure 2:
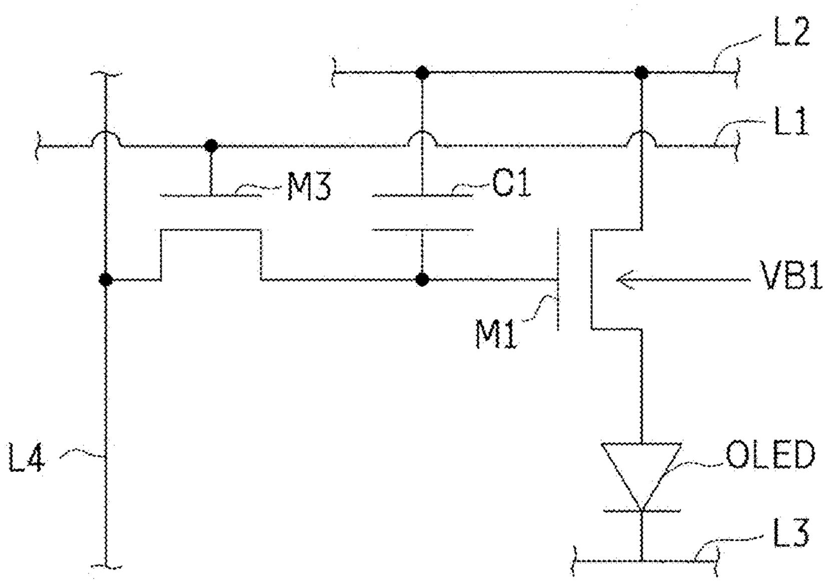
FIG. 2 is a circuit diagram illustrating one pixel of an organic EL display device according to Comparative Example 1.

First, a pixel configuration of an organic EL display device of each of Comparative Examples 1 and 2 will be described. FIG. 2 is a circuit diagram illustrating one pixel of an organic EL display device of Comparative Example 1. The pixel of Comparative Example 1 has a configuration in which the diode connection transistor M2 is omitted from the pixel circuit illustrated in FIG. 1. In Comparative Example 1, it is assumed that a constant potential VB1 is input to the back gate of the drive transistor M1. Although a circuit diagram of the pixel of Comparative Example 2 is similar to the circuit diagram of FIG. 1, it is assumed that the design of the drive transistor M1 and the design of the diode connection transistor M2 are the same.

Figure 3:
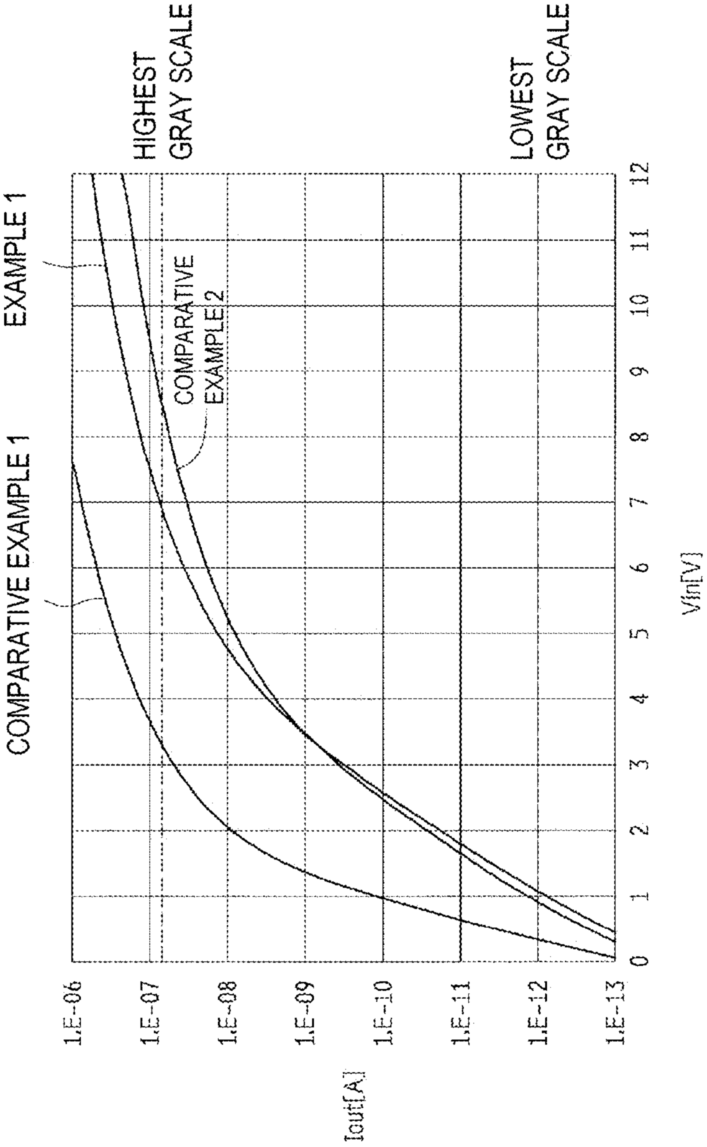
FIG. 3 is a graph showing a relationship between a data voltage input to a gate of a drive transistor and a current, regarding Comparative Examples 1 and 2 and Example 1.

FIG. 3 is a graph showing a relationship between the data voltage Vin input to the gate of the drive transistor M1 and the current Iout, regarding Comparative Examples 1 and 2, and Example 1 to be described below.

In Comparative Example 1, the current Iout rises steeply in a region where the data voltage Vin is low (that is, a region where the organic EL element OLED is operated for display at a low gray scale). This indicates that the current amount of the current Iout changes considerably (by orders of magnitude) with a slight fluctuation of the data voltage Vin in a low gray scale region, so that the gray scale control is difficult to be performed in the low gray scale region.

Next, in Comparative Example 2, by disposing the diode connection transistor M2, which serves as a load, on the source of the drive transistor M1, the response of the current Iout to the data voltage Vin can be gentle. In this manner, in Comparative Example 2, the gray scale control in the low gray scale region is facilitated as compared to Comparative Example 1. However, in Comparative Example 2, because the response of the current Iout to the data voltage Vin is gentle as a whole, many voltage widths are consequently allocated to a high gray scale region where gray scale steps are unlikely to be visually recognized. As a result, the data voltage Vin corresponding to the highest gray scale in Comparative Example 1 is approximately 3.5 V, whereas the data voltage Vin corresponding to the highest gray scale in Comparative Example 2 is approximately 9 V. Due to this, in Comparative Example 2, the data voltage width from the lowest gray scale to the highest gray scale is increased, and the power consumption of the organic EL display device is also increased.

Figure 4:
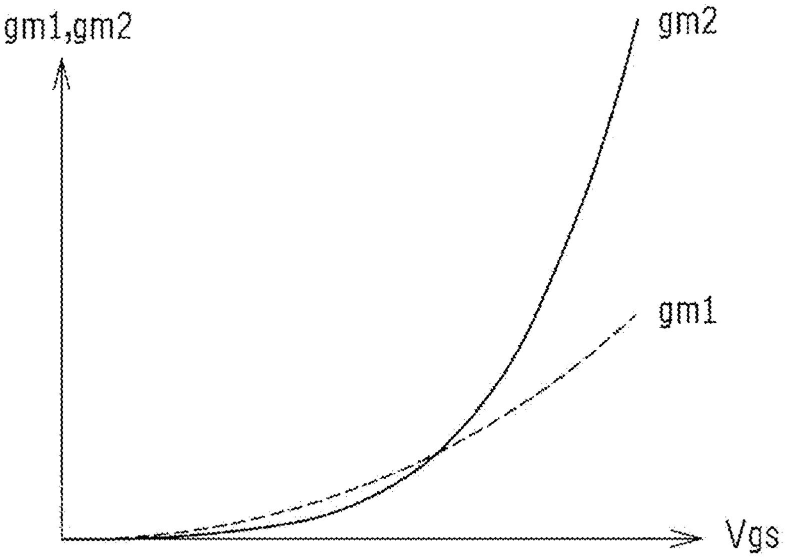
FIG. 4 is a graph of a voltage between a gate and source (Vgs) and transconductance (gm) in each of a drive transistor and a diode connection transistor of Example 1.

Subsequently, a pixel configuration of an organic EL display device according to Example 1 will be described. A pixel of Example 1 has a circuit configuration illustrated in FIG. 1, and the design of the drive transistor M1 and the design of the diode connection transistor M2 are different from each other. In other words, the pixel of Example 1 is designed so as to make the S value great at low luminance and make the S value low at high luminance. Specifically, in Example 1, the threshold value of the drive transistor M1 is adjusted to be lower than the threshold value of the diode connection transistor M2. In a case where the same potential is input to the data gates of the drive transistor M1 and the diode connection transistor M2, an on-current (a drain current in an on state) Ion1 of the drive transistor M1 is adjusted to be lower than an on-current Ion2 of the diode connection transistor M2 at high luminance. In other words, as shown in FIG. 4, transconductance gm2 of the diode connection transistor M2 is made to be greater than transconductance gm1 of the drive transistor M1 at high luminance.

As a method for adjusting the threshold value of the drive transistor M1 to be lower than the threshold value of the diode connection transistor M2, in Example 1 according to the first embodiment, a channel length $L_1$ of the drive transistor M1 is made to be shorter than a channel length $L_2$ of the diode connection transistor M2 to lower the threshold value of the drive transistor M1 by a short channel effect. The drive capability of a transistor may be adjusted by the ratio of a channel width W to a channel length L (W/L); thus, in Example 1, by the layout such that, a relation of $L_1<L_2$, and a relation of $(W/L)_1<(W/L)_2$ are satisfied, the on-current Ion1 of the drive transistor M1 can be made greater than the on-current Ion2 of the diode connection transistor M2 (Ion1>Ion2) at low luminance, and the on-current Ion1 of the drive transistor M1 can be made lower than the on-current Ion2 of the diode connection transistor M2 (Ion1<Ion2) at high luminance. In the above expressions, $(W/L)_1$ is the ratio of the channel width W to the channel length L of the drive transistor M1, and $(W/L)_2$ is the ratio of the channel width W to the channel length L of the diode connection transistor M2.

As for a method of determining the threshold value, from an Id-Vgs graph (see FIG. 7), an inclination is determined as indicated by an equation given below, and then the threshold value is determined by an intersection point between a tangent line having the inclination and a straight line where Id is equal to 1 [nA]. In this case, log takes the natural logarithm.

$$\text{Inclination}=(\partial \log(Id)/\partial V)\max$$

Figure 5:
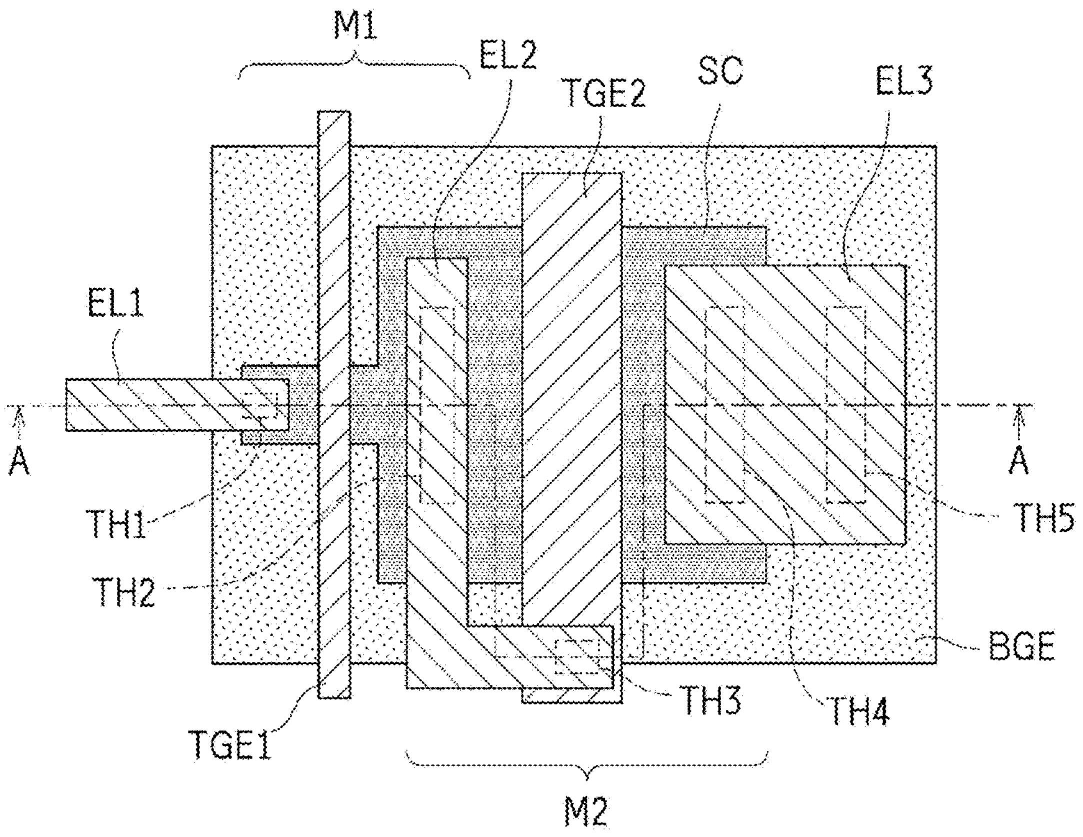
FIG. 5 is a plan view illustrating a configuration of one pixel of Example 1.
Figure 6:
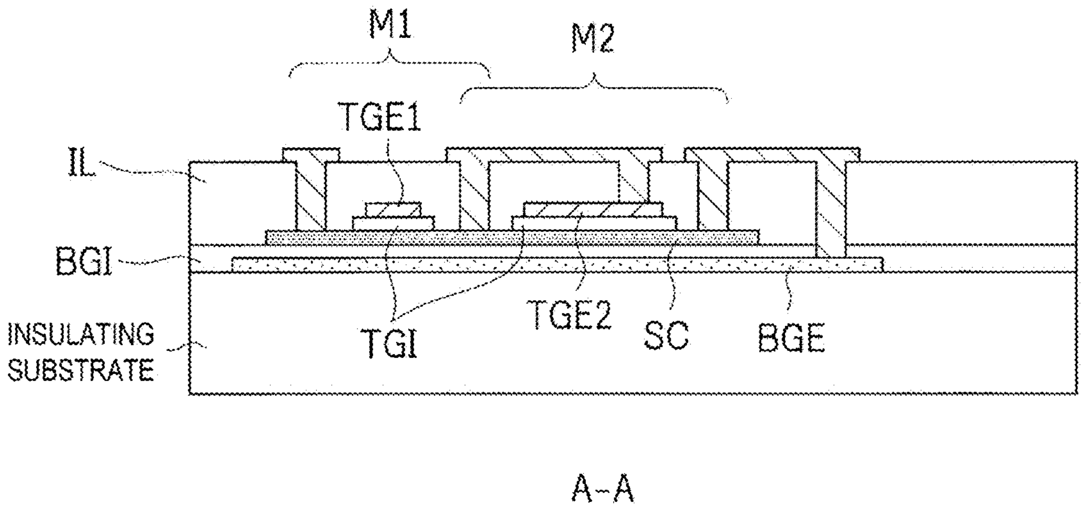
FIG. 6 is a cross-sectional view illustrating a configuration of one pixel of Example 1, in other words, a cross-sectional view taken along a line A-A in FIG. 5.

FIGS. 5 and 6 are diagrams illustrating a configuration of one pixel of Example 1, where FIG. 5 is a plan view and FIG. 6 is a cross-sectional view taken along a line A-A in FIG. 5. However, in FIG. 5, only a semiconductor layer, and wiring lines and electrode layers are illustrated, while an insulating substrate, insulating layers (gate insulating films and an interlayer insulating film), and the like are not illustrated.

As illustrated in FIG. 1, in the pixel according to Example 1, both the back gate of the drive transistor M1 and the back gate of the diode connection transistor M2 are connected to the source of the diode connection transistor M2. Due to this, in Example 1, the back gates thereof are formed to be a common back gate by a back-gate electrode BGE including both regions of the drive transistor M1 and the diode connection transistor M2.

A semiconductor layer SC is formed on the back-gate electrode BGE with a back-gate gate insulating film BGI interposed therebetween. The semiconductor layer SC is commonly shared by the drive transistor M1 and the diode connection transistor M2, where the channel width is formed to be low in the formation region of the drive transistor M1, and the channel width is formed to be great in the formation region of the diode connection transistor M2.

Gate electrodes TGE1 and TGE2 are each formed on the semiconductor layer SC with a gate insulating film TGI interposed therebetween. The gate electrode TGE1 is a gate electrode of the drive transistor M1, and the gate electrode TGE2 is a gate electrode of the diode connection transistor M2.

An interlayer insulating film IL is formed over the semiconductor layer SC and the gate electrodes TGE1 and TGE2, and electrodes EL1 to EL3 are further formed thereon.

The electrode EL1 acts as a drain electrode of the drive transistor M1, and is connected to the semiconductor layer SC via a through hole TH1.

The electrode EL2 acts as a source electrode of the drive transistor M1 and also acts at the same time as a drain electrode of the diode connection transistor M2, and is connected to the semiconductor layer SC via a through hole TH2. Furthermore, the electrode EL2 is also connected to the gate electrode TGE2 via a through hole TH3, and also has a function of short-circuiting the gate and the drain of the diode connection transistor M2.

The electrode EL3 also acts as a source electrode of the diode connection transistor M2, and is connected to the semiconductor layer SC via a through hole TH4. Furthermore, the electrode EL3 is also connected to the back-gate electrode BGE via a through hole TH5, and also has a function of connecting the source of the diode connection transistor M2 to the back gate of the drive transistor M1 as well as the back gate of the diode connection transistor M2.

As illustrated in FIGS. 5 and 6, the gate electrode TGE1 of the drive transistor M1 is thinner than the gate electrode TGE2 of the diode connection transistor M2. This causes the channel length of the drive transistor M1 to be shorter than the channel length of the diode connection transistor M2. The channel width of the drive transistor M1 is made to be narrower than the channel width of the diode connection transistor M2. Thus, as described above, in Example 1, the layout is such that the relation of $(W/L)_1<(W/L)_2$ is satisfied, and the on-current Ion1 of the drive transistor M1 is lower than the on-current Ion2 of the diode connection transistor M2.

Here, as in Comparative Example 2 and Example 1, in the configuration in which the diode connection transistor M2 is connected to the source of the drive transistor M1, the subthreshold coefficient S (S value) obtained by combining the drive transistor M1 and the diode connection transistor M2 is represented by Equation (1) given below.

$$S=(1+(1+a)\cdot gm1/gm2)\cdot S1 \quad (1)$$

However, S1 equals 1/gm1 in the above equation.

In addition, gm1 is transconductance of the drive transistor M1, and gm2 is transconductance of the diode connection transistor M2. Further, “a” is a back-gate control coefficient and is proportional to a capacity ratio of an upper gate insulating film to a lower gate insulating film. More specifically, when a back-gate side capacity of the transistor is taken as $C_{BGI}$ and a drive gate side capacity thereof is taken as $C_{GI}$, the back-gate control coefficient “a” is represented by an equation of $a=C_{BGI}/C_{GI}$. In this case, it is assumed that “a” takes a constant value of 1.

Figure 7:
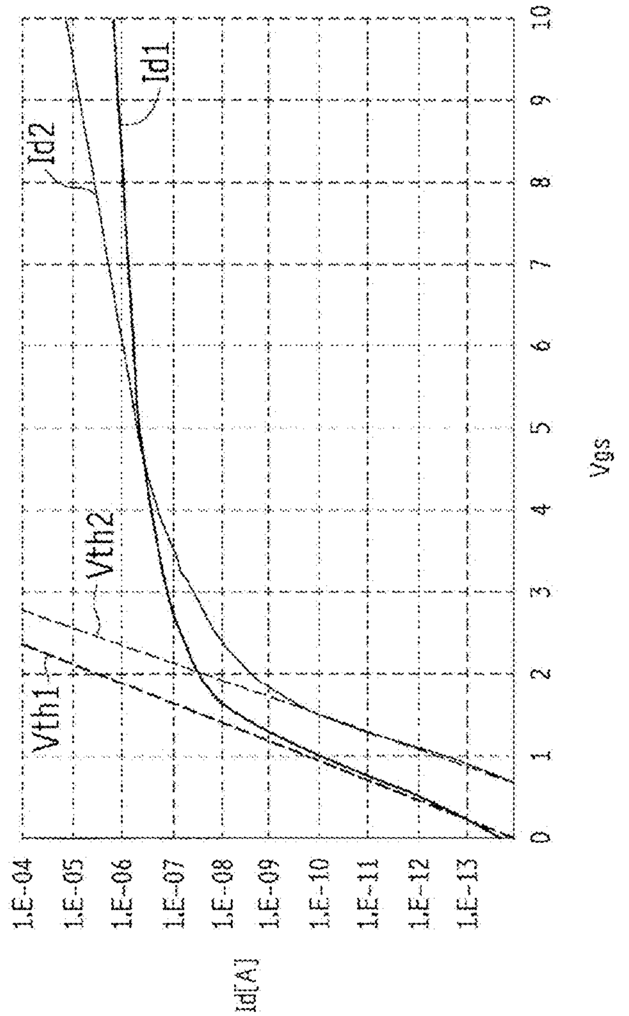
FIG. 7 is a graph of a drain current (Id) and a voltage between the gate and source (Vgs) in each of the drive transistor and the diode connection transistor of Example 1.

FIG. 7 is a graph of a drain current (Id) and a voltage between the gate and source (Vgs) in each of the drive transistor M1 and the diode connection transistor M2 of Example 1. The transconductance gm1 of the drive transistor M1 and the transconductance gm2 of the diode connection transistor M2 correspond to the inclination of the Id-Vgs graph of the drive transistor M1 and the inclination of the Id-Vgs graph of the diode connection transistor M2, respectively.

In the organic EL display device of Example 1, due to the threshold value of the drive transistor M1 being lower than the threshold value of the diode connection transistor M2, at low luminance, the S value increases by a relation of Id1>Id2, that is, gm1>gm2, and when the current is low, the diode connection transistor M2 becomes effective as a source load with respect to the drive transistor M1, thereby making it easy to perform control at a low gray scale. At high luminance, the S value decreases by a relation of Id2>Id1, that is, gm2>gm1, and when the current is high (a high gray scale driving time of the organic EL element OLED), the diode connection transistor M2 is disabled as a source load with respect to the drive transistor M1, so that the current is likely to flow into the organic EL element OLED, thereby making it easy to perform control at a high gray scale as well.

In this way, in the organic EL display device of Example 1, the diode connection transistor M2 is effective as a source load in the low gray scale region, and therefore, as shown also in FIG. 3, the response of the current Iout to the data voltage Vin may be gentle as in Comparative Example 2. With this, in Example 1, the gray scale control in the low gray scale region is facilitated compared to Comparative Example 1.

Furthermore, in Example 1, the diode connection transistor M2 is disabled as a source load in the high gray scale region, and therefore, unlike in Comparative Example 2, many voltage widths can be prevented from being allocated to the high gray scale region. As a result, the data voltage Vin corresponding to the highest gray scale is approximately 9 V in Comparative Example 2, whereas the data voltage Vin corresponding to the highest gray scale is suppressed to be approximately 7 V in Example 1. With this, in Example 1, the increase in power consumption of the organic EL display device is suppressed compared to Comparative Example 2. In addition, because the amplitude of the data signal is reduced, the cost of the driver may also be reduced.

Second Embodiment

A second embodiment according to the disclosure will be described below in detail with reference to the drawings. Here, a pixel configuration of an organic EL display device according to the second embodiment will be described as Example 2.

A pixel of Example 2 has a circuit configuration illustrated in FIG. 1, and the design of the drive transistor M1 and the design of the diode connection transistor M2 are different from each other. In other words, the pixel of Example 2 is designed so as to make the S value great at low luminance and make the S value low at high luminance. Specifically, similar to the case of Example 1, the threshold value of the drive transistor M1 is adjusted to be lower than the threshold value of the diode connection transistor M2. In a case where the same potential is input to the data gates of the drive transistor M1 and the diode connection transistor M2, an on-current (a drain current in the on state) Ion1 of the drive transistor M1 is adjusted to be lower than an on-current Ion2 of the diode connection transistor M2 at high luminance. In other words, the transconductance gm2 of the diode connection transistor M2 is made to be greater than the transconductance gm1 of the drive transistor M1 at high luminance.

In Example 1, the threshold value of the transistor is adjusted by changing the channel length, but in Example 2, the threshold value is adjusted by changing a capacity on the data gate side. That is, in Example 2, by satisfying, a relation of $(Cox)_1>(Cox)_2$, and a relation of $(Cox\cdot W/L)_1<(Cox\cdot W/L)_2$, the on-current Ion1 of the drive transistor M1 can be made greater than the on-current Ion2 of the diode connection transistor M2 (Ion1>Ion2) at low luminance, and the on-current Ion1 of the drive transistor M1 can be made lower than the on-current Ion2 of the diode connection transistor M2 (Ion1<Ion2) at high luminance. In the above expressions, $(Cox)_1$ is a channel capacity of the drive transistor M1, and $(Cox)_2$ is a channel capacity of the diode connection transistor M2. The channel capacity indicates a capacity between the data gate and the channel.

Figure 8:
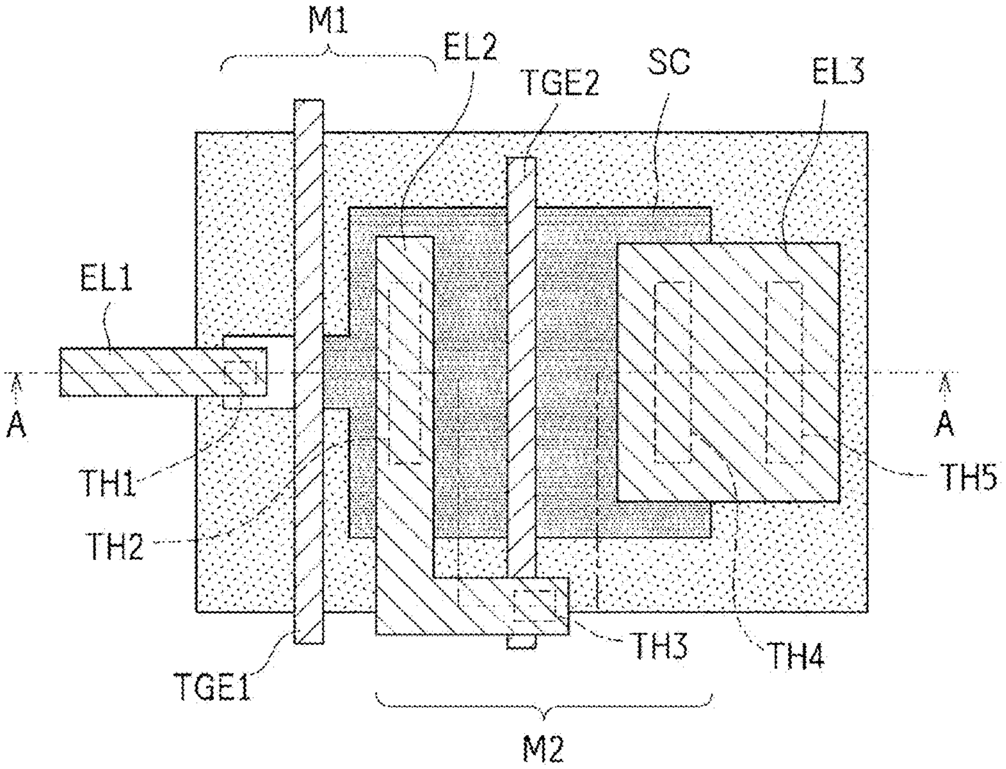
FIG. 8 is a plan view illustrating a configuration of one pixel of Example 2.
Figure 9:
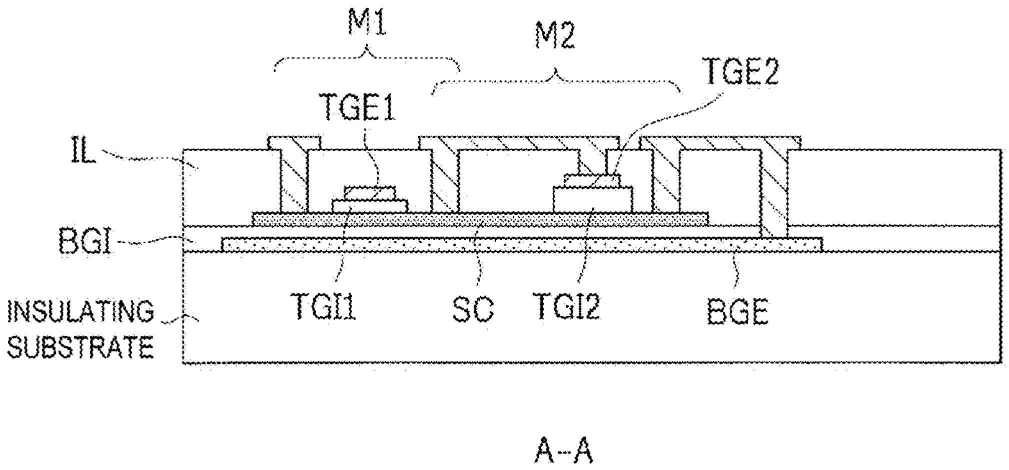
FIG. 9 is a cross-sectional view illustrating a configuration of one pixel of Example 2, in other words, a cross-sectional view taken along a line A-A in FIG. 8.

FIGS. 8 and 9 are diagrams illustrating a configuration of one pixel of Example 2, where FIG. 8 is a plan view and FIG. 9 is a cross-sectional view taken along a line A-A in FIG. 8. However, in FIG. 8, only a semiconductor layer, and wiring lines and electrode layers are illustrated, while an insulating substrate, insulating layers (gate insulating films and an interlayer insulating film), and the like are not illustrated. In order to satisfy the relation of $(Cox)_1>(Cox)_2$, a dielectric constant of the gate insulating film on the data gate side of the drive transistor M1 is made to be greater than a dielectric constant of the gate insulating film on the data gate side of the diode connection transistor M2 (for example, a high-k film is used), and the film thickness of the gate insulating film on the data gate side of the drive transistor M1 is made to be thinner than the film thickness of the gate insulating film on the data gate side of the diode connection transistor M2.

As illustrated in FIGS. 8 and 9, the gate electrode TGE2 of the diode connection transistor M2 in Example 2 is thinner than the gate electrode TGE2 in Example 1 (see FIGS. 5 and 6). As a result, in Example 2, the gate electrode TGE1 of the drive transistor M1 and the gate electrode TGE2 of the diode connection transistor M2 have substantially the same thickness (in this case, the channel lengths of the drive transistor M1 and the diode connection transistor M2 are substantially equal to each other). Further, in Example 2, a gate insulating film TGI1 of the drive transistor M1 is formed to be thinner than a gate insulating film TGI2 of the diode connection transistor M2. As a result, in Example 2, at low luminance, because the relation of $(Cox)_1>(Cox)_2$ is satisfied, the on-current Ion1 of the drive transistor M1 is greater than the on-current Ion2 of the diode connection transistor M2; and at high luminance, because the relation of $(Cox\cdot W/L)_1<(Cox\cdot W/L)_2$ is satisfied, the on-current Ion1 of the drive transistor M1 is lower than the on-current Ion2 of the diode connection transistor M2.

In the organic EL display device of Example 2 as well, the threshold value of the drive transistor M1 is lower than the threshold value of the diode connection transistor M2 (the on-current Ion1 of drive transistor M1 is lower than the on-current Ion2 of the diode connection transistor M2). As a result, similar to Example 1, when the current is low (at a low gray scale driving time of the organic EL element OLED), the diode connection transistor M2 is effective as a source load with respect to the drive transistor M1; on the other hand, when the current is high (a high gray scale driving time of the organic EL element OLED), the diode connection transistor M2 is disabled as a source load with respect to the drive transistor M1.

Accordingly, in the organic EL display device of Example 2 as well, the gray scale control in the low gray scale region is easy to be performed as compared to Comparative Example 1, and the increase in power consumption of the organic EL display device is suppressed as compared to Comparative Example 2. In addition, because the amplitude of the data signal is reduced, the cost of the driver may also be reduced.

Third Embodiment

In the first and second embodiments, the configuration including one diode connection transistor M2 has been exemplified, but a plurality of diode connection transistors M2 may be provided for one pixel.

Figure 10:
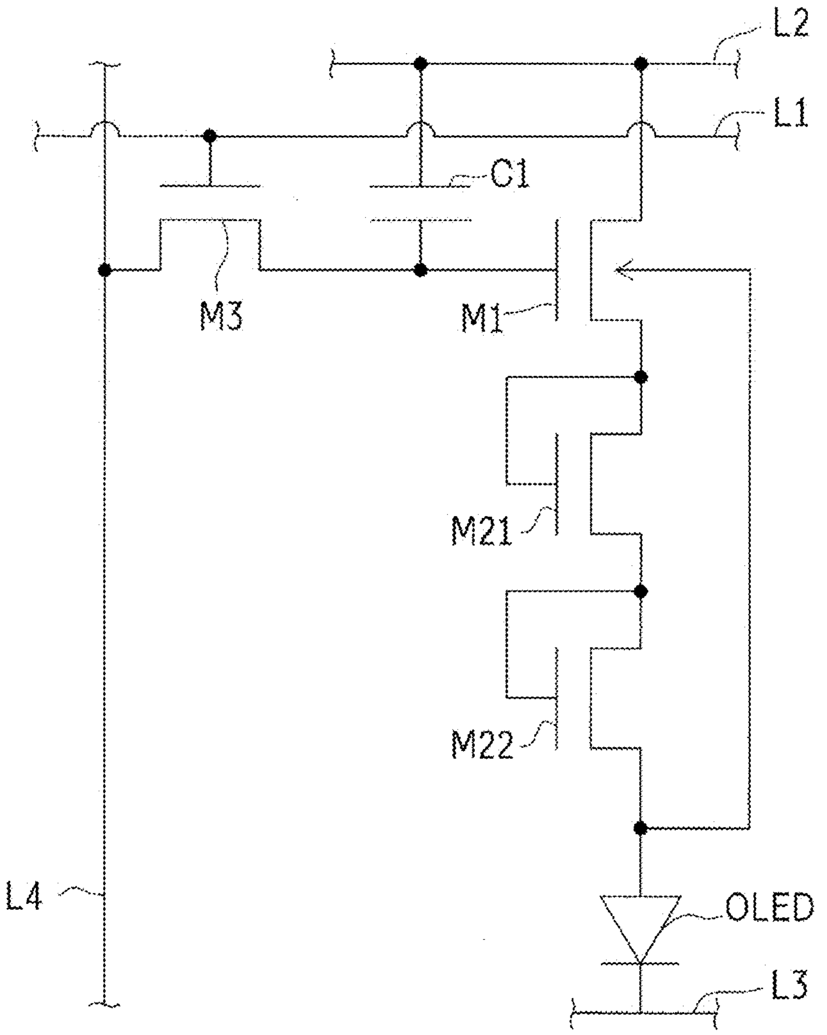
FIG. 10 is a circuit diagram illustrating one pixel of an organic EL display device according to a third embodiment.

FIG. 10 is a circuit diagram illustrating one pixel of an organic EL display device provided with a plurality (two in this case) of diode connection transistors M21 and M22. In this manner, when the plurality of diode connection transistors M21 and M22 are provided, the plurality of diode connection transistors M21 and M22 are connected in series between the source of a drive transistor M1 and an organic EL element OLED. In the case where the source of the diode connection transistor is connected to the back gate of the drive transistor M1, the source of the diode connection transistor M22 closest to the organic EL element OLED is connected to the back gate of the drive transistor M1. Although not illustrated in FIG. 10, the source of the diode connection transistor M22 may be connected to the back gate of the other diode connection transistor M21, or the back gate of the diode connection transistor M22 itself.

Fourth Embodiment

As a configuration in which the S value is made to be great at low luminance and the S value is made to be low at high luminance, the channel of a drive transistor M1 may be formed by an oxide semiconductor, and the channel of a diode connection transistor M2 may be formed by polysilicon. At this time, it is sufficient that a threshold value $Vth_1$ of the drive transistor M1 and a threshold value $Vth_2$ of the diode connection transistor M2 satisfy a relation of $Vth_1<Vth_2$.

In this threshold control, because the channels of the drive transistor M1 and the diode connection transistor M2 are semiconductor films different from each other, the threshold values are easy to be controlled individually. In the case of the oxide semiconductor, the threshold value may be adjusted by adjusting hydrotreating or the like for achieving conductivity; and in the case of the polysilicon, the threshold value may be adjusted by adjusting the doping amount or the like for achieving conductivity. As a result, because the mobility in the polysilicon is greater than that in the oxide semiconductor by at least one order of magnitude, at low luminance, the S value becomes great by satisfying a relation of Id1>Id2, that is, a relation of gm1>gm2, so that the control at a low gray scale is facilitated. At high luminance, a relation of Id2>Id1, that is, a relation of gm2>gm1 is satisfied, so that the S value becomes low and a current is likely to flow through the organic EL element OLED, thereby facilitating the control at a high gray scale as well.

A method of forming a semiconductor film of transistors with an oxide semiconductor and polysilicon on the same substrate is as follows: a base coat layer, a polysilicon film, a first gate insulating film, a first gate electrode, a second gate insulating film, an oxide semiconductor film, a third gate insulating film, a second gate electrode, and an interlayer insulating film are formed in that order from an insulating substrate side. At this time, the first gate electrode is used as the data gate of the diode connection transistor M2 and the back gate of the drive transistor M1, and the second gate electrode is used as the data gate of the drive transistor M1.

When a back gate is provided in the diode connection transistor M2, it is sufficient to further provide a gate electrode and a gate insulating film between the base coat layer and the polysilicon film.

The display device described in each of the first through fourth embodiments is not limited to any specific one as long as the device includes a current-driven display element. Examples of the current-driven display element include an organic EL display equipped with an organic light-emitting diode (OLED), an inorganic EL display equipped with an inorganic light-emitting diode, a quantum dot light emitting diode (QLED) display equipped with a QLED and the like.

The embodiments disclosed herein are illustrative in all respects and are not a rationale for limited interpretation. Therefore, the technical scope of the disclosure is not to be construed only by the above-described embodiments, but is defined based on the description of the claims. In addition, all changes within the claims and within the meaning and range of equivalence are included.

The invention claimed is:

1. A display device, comprising:
a display element configured to emit light by a current flowing through the display element;
a capacitor configured to hold a data voltage;
a drive transistor with a data gate connected to one electrode of the capacitor; and
a diode connection transistor connected between a source of the drive transistor and the display element, wherein
a source of the diode connection transistor is connected to a back gate of the drive transistor,
in a case where a channel length of the drive transistor is taken as $L_1$, a channel length of the diode connection transistor is taken as $L_2$, a ratio of a channel width W to a channel length L of the drive transistor is taken as $(W/L)_1$, and a ratio of a channel width W to a channel length L of the diode connection transistor is taken as $(W/L)_2$,
a relation of $L_1<L_2$, and
a relation of $(W/L)_1<(W/L)_2$ are satisfied, and
a back gate of the diode connection transistor is connected to the source of the diode connection transistor.

2. The display device according to claim 1,
wherein in a case where a threshold value of the drive transistor is taken as $Vth_1$ and a threshold value of the diode connection transistor is taken as $Vth_2$, a relation of $Vth_1<Vth_2$ is satisfied.

3. The display device according to claim 1,
wherein the back gate of the drive transistor and the back gate of the diode connection transistor are formed to be common to each other, and the common back gate is connected to the source of the diode connection transistor.

4. The display device according to claim 1,
wherein a plurality of the diode connection transistors are provided, and a source of the diode connection transistor closest to the display element is connected to the back gate of the drive transistor.

5. The display device according to claim 1,
wherein a constant-voltage power supply is connected to the back gate of the diode connection transistor.

6. The display device according to claim 5,
wherein the constant-voltage power supply is a low-level power supply.

7. A display device, comprising:
a display element configured to emit light by a current flowing through the display element;
a capacitor configured to hold a data voltage;
a drive transistor with a data gate connected to one electrode of the capacitor; and
a diode connection transistor connected between a source of the drive transistor and the display element, wherein
a source of the diode connection transistor is connected to a back gate of the drive transistor, and
in a case where a channel capacity of the drive transistor is taken as $(Cox)_1$, a channel capacity of the diode connection transistor is taken as $(Cox)_2$, (channel capacity·channel width/channel length) of the drive transistor is taken as $(Cox \cdot W/L)_1$, and (channel capacity·channel width/channel length) of the diode connection transistor is taken as $(Cox \cdot W/L)_2$,
a relation of $(Cox)_1>(Cox)_2$, and
a relation of $(Cox \cdot W/L)_1<(Cox \cdot W/L)_2$ are satisfied, and
a back gate of the diode connection transistor is connected to the source of the diode connection transistor.

8. The display device according to claim 7,
wherein a first gate insulating film of the data gate of the drive transistor and a second gate insulating film of a data gate of the diode connection transistor satisfy a relation of (a film thickness of the first gate insulating film)<(a film thickness of the second gate insulating film).

9. The display device according to claim 7,
wherein a first gate insulating film of the data gate of the drive transistor and a second gate insulating film of a data gate of the diode connection transistor satisfy a relation of (a dielectric constant of the first gate insulating film)>(a dielectric constant of the second gate insulating film).

10. The display device according to claim 7,
wherein in a case where a threshold value of the drive transistor is taken as $Vth_1$ and a threshold value of the diode connection transistor is taken as $Vth_2$, a relation of $Vth_1<Vth_2$ is satisfied.

11. The display device according to claim 7,
wherein the back gate of the drive transistor and the back gate of the diode connection transistor are formed to be common to each other, and the common back gate is connected to the source of the diode connection transistor.

12. The display device according to claim 7,
wherein a plurality of the diode connection transistors are provided, and a source of the diode connection transistor closest to the display element is connected to the back gate of the drive transistor.

13. A display device, comprising:
a display element configured to emit light by a current flowing through the display element;
a capacitor configured to hold a data voltage;
a drive transistor with a data gate connected to one electrode of the capacitor; and
a diode connection transistor connected between a source of the drive transistor and the display element, wherein
a source of the diode connection transistor is connected to a back gate of the drive transistor,
a channel of the drive transistor is made of an oxide semiconductor, and a channel of the diode connection transistor is made of polysilicon, and
a back gate of the diode connection transistor is connected to the source of the diode connection transistor.

14. The display device according to claim 13,
wherein in a case where a threshold value of the drive transistor is taken as $Vth_1$ and a threshold value of the diode connection transistor is taken as $Vth_2$, a relation of $Vth_1<Vth_2$ is satisfied.

15. The display device according to claim 13,
wherein the back gate of the drive transistor and the back gate of the diode connection transistor are formed to be common to each other, and the common back gate is connected to the source of the diode connection transistor.

16. The display device according to claim 13,
wherein a plurality of the diode connection transistors are provided, and a source of the diode connection transistor closest to the display element is connected to the back gate of the drive transistor.

* * * * *